(12) United States Patent
Beyda et al.

(10) Patent No.: US 6,385,298 B1
(45) Date of Patent: May 7, 2002

(54) INTEGRATED COMMUNICATION ERROR REPORTING SYSTEM

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/152,363

(22) Filed: Sep. 14, 1998

(51) Int. Cl.[7] ................................................. H04M 1/24
(52) U.S. Cl. ....................... 379/9; 379/1.01; 379/9.03; 379/15.01; 379/32.01
(58) Field of Search ........................... 379/1, 9, 10, 15, 379/32, 1.01, 9.02, 9.03, 32.01; 714/48, 57

(56) References Cited

U.S. PATENT DOCUMENTS

| | | | | |
|---|---|---|---|---|
| 4,464,543 A | * | 8/1984 | Kline et al. ..................... 379/1 |
| 4,972,453 A | * | 11/1990 | Daniel et al. .................. 379/10 |
| 5,784,359 A | * | 7/1998 | Bencheck et al. ........... 370/244 |
| 5,875,242 A | * | 2/1999 | Glaser et al. ................ 379/207 |
| 5,896,440 A | * | 4/1999 | Reed et al. ..................... 379/1 |
| 5,930,333 A | * | 7/1999 | Jabbarnezhad ................ 379/14 |
| 5,946,372 A | * | 8/1999 | Jones et al. ..................... 379/1 |
| 5,946,375 A | * | 8/1999 | Pattison et al. ............... 379/34 |
| 5,953,389 A | * | 9/1999 | Pruett et al. .................... 379/9 |
| 6,005,920 A | * | 12/1999 | Fuller et al. .................... 379/1 |
| 6,032,184 A | * | 2/2000 | Cogget et al. .............. 709/223 |
| 6,219,648 B1 | * | 4/2001 | Jones et al. ..................... 705/8 |
| 6,230,287 B1 | * | 5/2001 | Pinard et al. ................. 714/31 |

* cited by examiner

Primary Examiner—Curtis Kuntz
Assistant Examiner—Q. Tran

(57) ABSTRACT

An error reporting system in a communication system of the type that includes a PBX (10) and a monitoring system (20) that forwards internally detected errors from the PBX to a customer service center (28). A trouble ticket server (30) is coupled via a switch contact (40) to the monitoring system and is programmed to close the switch contact in an event a user reported error message is received. Upon detecting the contact closure, the monitoring system forwards an external alarm message to the customer service center. Alternatively, the trouble ticket server may be connected to the monitoring system via a serial communication link (52) that forwards a description of the user reported error to the monitoring system. The monitoring system may direct the PBX to run one or more diagnostic tests and forward the results of the tests to the customer service center along with the description of the user reported error.

8 Claims, 3 Drawing Sheets

INTEGRATED COMMUNICATION ERROR REPORTING SYSTEM

FIELD OF THE INVENTION

The present invention relates to communication systems in general, and in particular to systems for reporting user specified errors in telephone systems.

BACKGROUND OF THE INVENTION

Most communication systems that connect a number of telephones to one or more outside telephone lines are controlled by a private branch exchange (PBX). The PBX operates to connect telephones to an outside line as well as to connect one or more telephones together internally for intercom applications. In addition, most modern PBXs support advanced features such as voice mail, automatic number identification (ANI), call forwarding etc.

In any communication system, it is inevitable that malfunctions will eventually occur. To handle internally detected errors, most PBXs are paired with a robust monitoring system that includes a modem to forward an indication of an error to a customer service center. The customer service center receives an error message and can dispatch a service technician to remedy the problem. While such a system works well for errors that can be detected by the PBX's own internal diagnostic routines, the system cannot be used to notify the customer service center of errors that are reported by users of the system.

To report these types of errors, most communication systems also include a separate, dedicated trouble ticket computer system. A network supervisor receives calls from users explaining their problems and enters a description of the problems into the trouble ticket computer system. Alternatively, in more sophisticated systems, each user may be able to enter a description of a problem from a personal computer connected to a trouble ticket server computer via a local or wide area network. In one type of system, the trouble ticket computer then prints out a hard copy of the problem (the trouble ticket) and the network supervisor then forwards the ticket to the customer service center to evaluate the problem or schedule a repair. In another system, the trouble tickets may be written by hand. These methods of reporting errors are subject to several problems. First, trouble tickets may get lost or the information contained therein may not be accurately forwarded to the customer service center by the network administrator. Furthermore, the reporting of errors is delayed by the time it takes the network supervisor to manually process the trouble tickets.

Given the shortcomings associated with the prior art method of handling user reported errors in a communication system, there is a need for a system that can more accurately and quickly transmit such errors to a customer service center.

SUMMARY OF THE INVENTION

The present invention increases the speed and accuracy by which error or problem messages reported by users of a PBX based telephone communication system are forwarded to a customer service center. The communication system includes a monitoring system coupled to the PBX to receive an indication of internally detected errors and to forward the errors to the customer service center. A trouble ticket server computer receives and stores the error messages entered by a network administrator or directly by users of the communication system. The trouble ticket server is connected to the monitoring system via a contact switch. Upon the receipt of a user generated error message, the trouble ticket server closes the contact which is in turn detected by the monitoring system. The monitoring system then generates an external alarm message which is transmitted via a modem to the customer service center in order to request the dispatch of a service technician.

The monitoring system may be coupled to the trouble ticket server by a serial communication link or LAN over which the contents of the user reported error messages are transmitted to the monitoring system. The monitoring system then requests one or more diagnostic reports from the private branch exchange prior to forwarding the contents of the error message to the customer service center. A technician at the customer service center can then review the error message and the diagnostic reports in order to inform a service technician as to the likely source of the error.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an error reporting system that automatically alerts a customer service center of user reported errors or problems.

Figure 1:
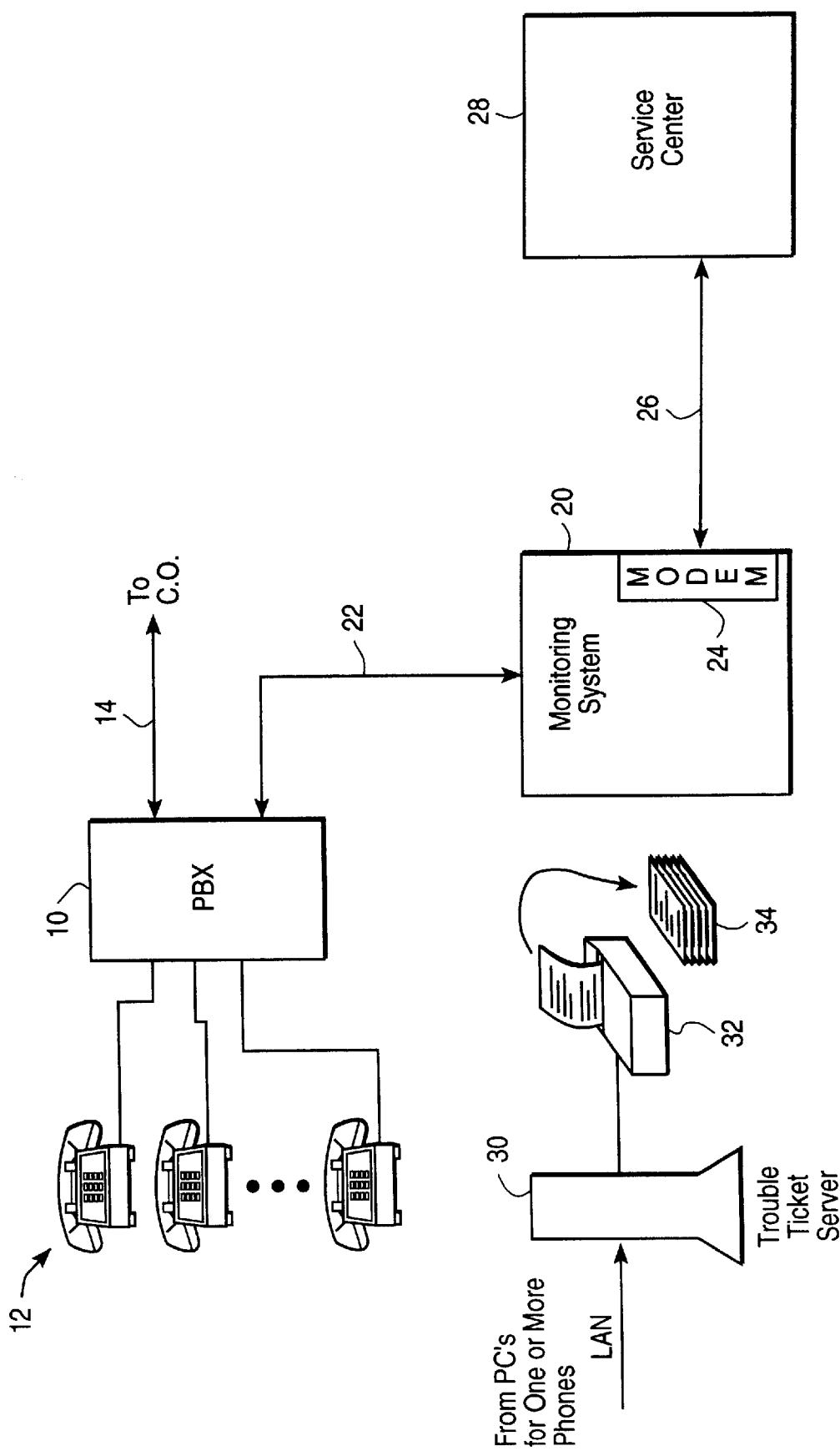
FIG. 1 is a block diagram of a prior art error reporting system for a PBX-based telephone communication system.

FIG. 1 illustrates a traditional type of error reporting system commonly used with small to medium sized telephone communication systems. Most telephone systems that connect a number of telephones to an outside line generally include a private branch exchange (PBX) 10 that serves as the interface between the individual telephones 12 and one or more outside telephone lines or trunks 14 that are connected to a telephone central office (not shown). The PBX 10 operates to connect any of the individual telephone lines 12 to an available trunk 14. In addition, the PBX 10 can connect any of the individual telephones 12 together in order to provide internal intercom communications.

During the operation of the PBX 10, it is inevitable that some errors or malfunctions will occur. Therefore, most PBXs are operated in conjunction with a monitoring system 20 that is in communication with the PBX 10 over a communication link 22, which is typically a serial data line. The monitoring system 20 is designed to be highly robust such that it will continue to operate in the event of power failure, overheating or other extreme conditions. Errors that are detected by the PBX 10 during diagnostic self-tests, are forwarded to the monitoring system 20. The monitoring system 20 includes a modem or other communication device 24 that forwards an indication of the error over a telephone link 26 to a customer service center 28. The customer service center receives the error and can dispatch a service technician to remedy the problem. While this system works well for errors that can be detected internally by the PBX 10, the system cannot detect user reported errors such as broken keys on a telephone, heavy static or echo on a line, etc.

To report these types of problems, most communication systems include a dedicated computer system or trouble ticket server 30 that is used to print reports of user reported errors. The trouble ticket server 30 may be a stand-alone system which is operated by a network supervisor to record user reported problems. Alternatively, if the communication system is designed to support a large number of users, the trouble ticket server 30 is often connected by a local area network (LAN) or a wide area network (WAN) to a number of personal computers. Each user of the system typically has access to a personal computer which is connected to the trouble ticket server by the LAN or WAN so that the user can enter a description of the problem directly. Connected to the trouble ticket server 30 is a printer 32 that produces paper reports 34 (the trouble tickets) that contain a description of the problem as entered by the network supervisor or by the individual users. The network supervisor then forwards the paper reports 34 to the customer service center 28 where they are reviewed and a service technician can be dispatched if desired.

As indicated above, the error reporting system shown in FIG. 1 is inefficient because the paper reports 34 may become lost or may not be accurately translated to the service center 28. In addition, there may be a delay between the time the reports are printed and the time that they are forwarded to the service center 28.

To improve upon the error reporting system shown in FIG. 1, the present invention creates an automated connection between the trouble ticket server 30 and the existing monitoring system 20.

One convenient method of connecting the trouble ticket server 30 with the monitoring system 20 is to use a switch contact on the monitoring system 20. Most monitoring systems include one or more simple switch contacts 40 that are periodically polled by the monitoring system to determine whether the switch contact is open or closed. Traditionally, these inputs are connected to external devices such as an air conditioning system, so that if the air conditioning system fails, the contact assumes a predefined state and the monitoring system can generate an appropriate alarm which is forwarded to the customer service center.

To connect the trouble ticket server 30 with the monitoring system 20, the trouble ticket server 30 includes a switch card 42 having a relay that is programmed to close one of the switch contacts 40 upon receipt of a user entered error message. Once the monitoring system 20 determines that a switch contact 40 is closed, it generates an external alarm message that is forwarded to the customer service center 28 via its internal modem 24. The alarm message indicates to the customer service center that a user has reported a problem with their phone system. Preferably, the user reports an error by filling out a form or checking one or more boxes that contain a description of the problem. The information entered by the user is stored in the trouble ticket server 30. If desired, the customer service center 28 can then access the trouble ticket server 30 by calling a modem 44 within the trouble ticket server over a conventional telephone line 50 in order to retrieve more information regarding the error reported so that the service technician can be prepared to fix the error.

Figure 2:
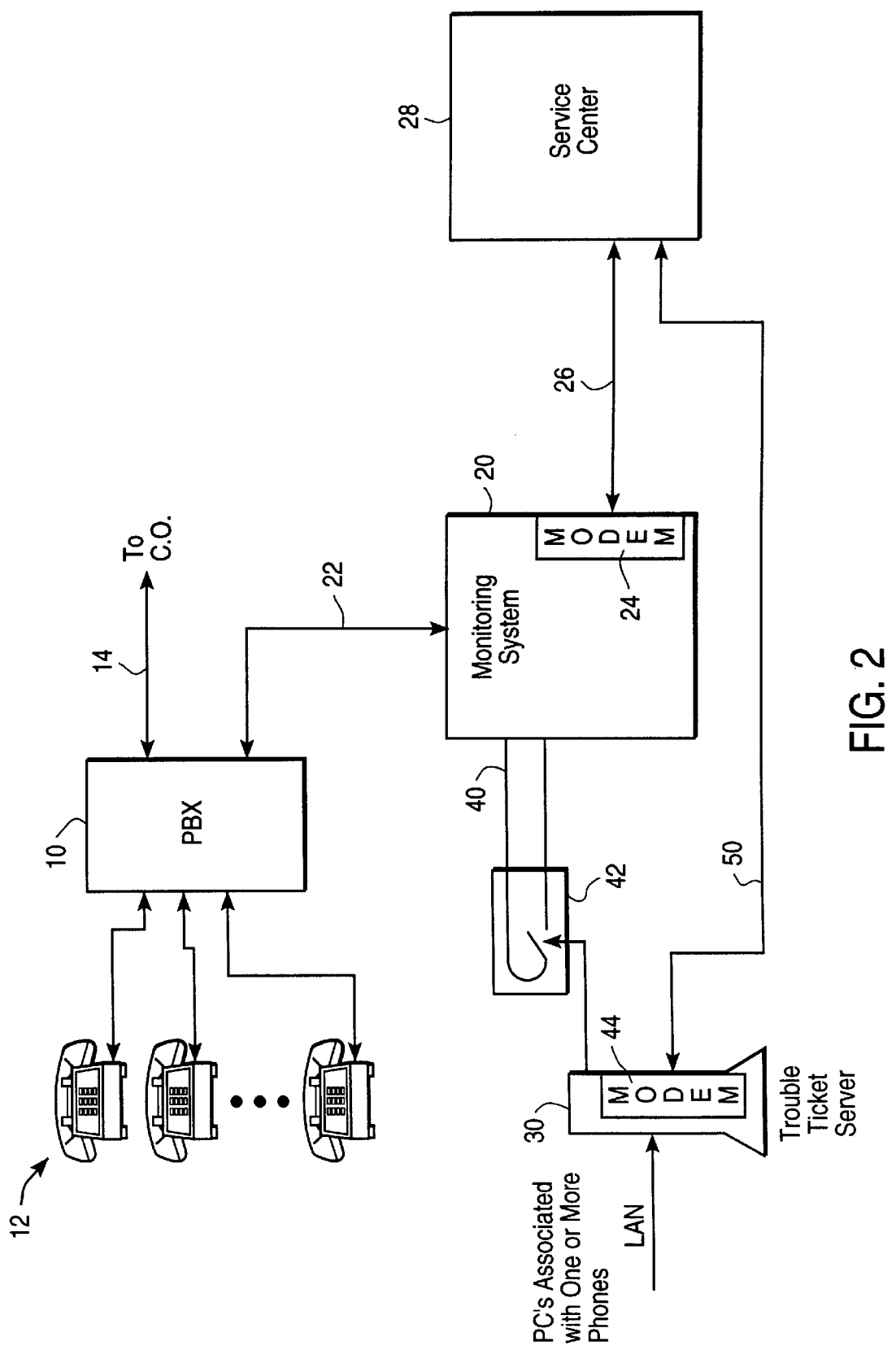
FIG. 2 is a block diagram of an error reporting system according to the present invention.

The advantage of using the system of the type shown in FIG. 2 is that an error reported by a user is immediately forwarded to the customer service center 28 without having to wait for the network supervisor to manually forward the contents of a trouble ticket to the customer service center. In addition, by having the customer service center interrogate the trouble ticket server directly, there is less likelihood that the nature of the problem or error will be misinterpreted.

Figure 3:
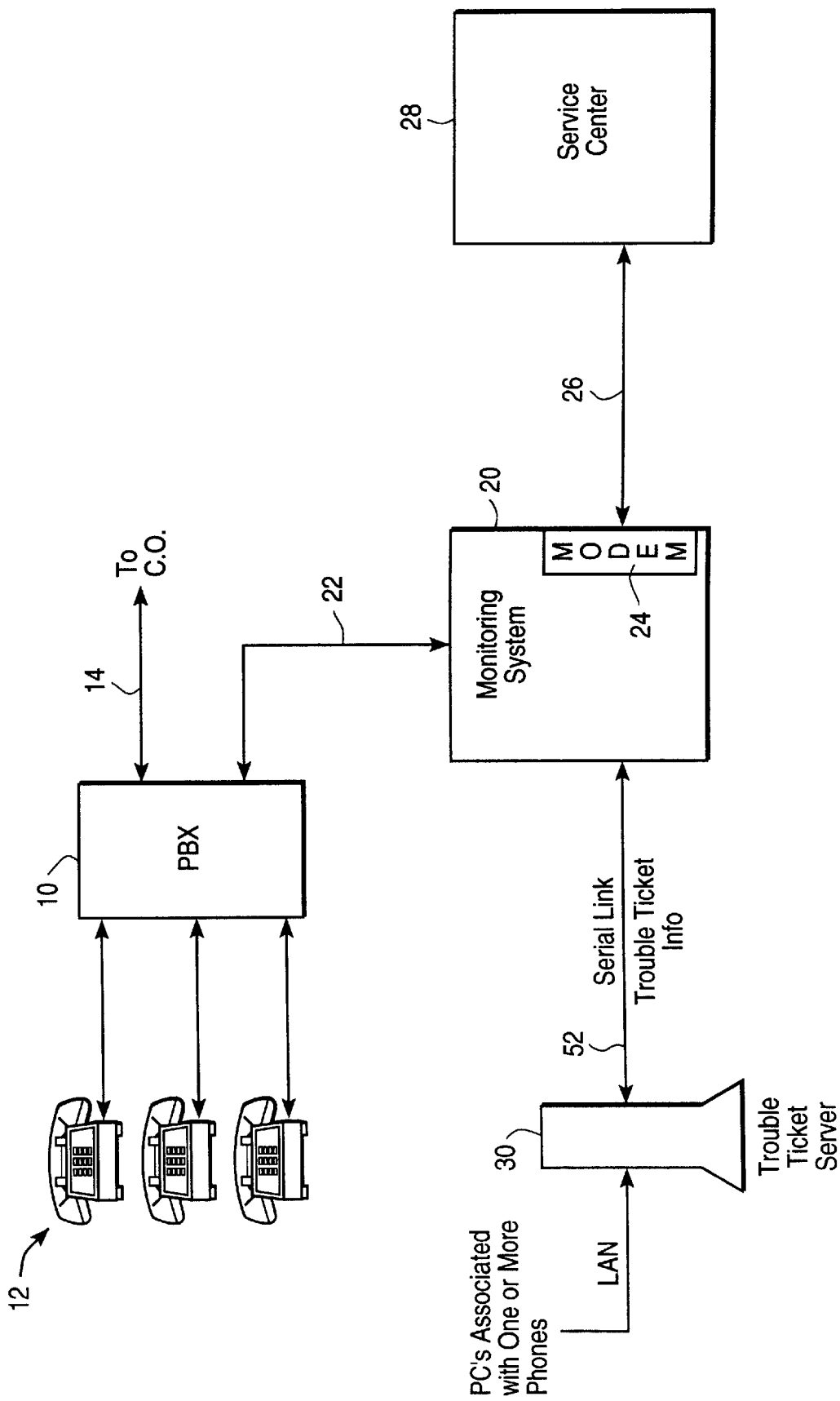
FIG. 3 is a block diagram of an alternative embodiment of the error reporting system according to the present invention.

FIG. 3 shows an alternative embodiment of the error reporting system according to the present invention. In the embodiment shown in FIG. 3, the switch contact connection between the trouble ticket server 30 and the monitoring system 20 is replaced by a communication link 52, which is typically a serial or LAN connection. Upon the receipt of a user reported error message, the trouble ticket server 30 transmits the contents of the trouble ticket over the link 52 to the monitoring system 20. The monitoring system 20 then transmits the trouble ticket information to the customer service center 28 using the modem 24 and the telephone line 26. Representatives at the customer service center 28 are therefore provided with the complete information entered by a user and can more accurately diagnose the problem and equip the service technician for its repair. The arrangement shown in FIG. 3 eliminates the need for the customer service center to query the trouble ticket server directly.

Because the monitoring system 20 is microprocessor-based, it can be programmed to operate as an expert system so that it may interpret the information contained in a trouble ticket and request one or more reports from the PBX 10 prior to transmission of the trouble ticket information to the customer service center. For example, if a user has reported a lack of dial tone on their telephone, the monitoring system may request the PBX 10 to run a self-test on the dial tone generator to determine if it is working. The results of the self-test may be forwarded to the customer service center to provide an indication whether the problem lies in the user's telephone or within the PBX itself.

As will be appreciated from the above description, the present invention is a method for more accurately and quickly reporting user reported errors in a communication system to a customer service center. The invention is easily adapted to existing PBX and monitoring systems and does not significantly increase the complexity of the monitoring system.

The embodiments of the invention in which an exclusive property or privilege is claimed are defined as follows:

1. A communication system comprising:
   a private exchange (PBX) for connecting a plurality of telephones to one or more external telephone lines;
   a monitoring system that receives indications of internally detected errors within the PBX and a modem which forwards the indications of the internally detected errors to a customer service center; and
   a trouble ticket server that receives indications of reported errors not detected by the monitoring system, the trouble ticket server being coupled to the monitoring system such that upon the receipt of a reported error, the monitoring system, without further human intervention, notifies the customer service center that a reported error has been received.

2. The system of claim 1, wherein the monitoring system includes one or more switch contacts that are periodically polled by the monitoring system and wherein the trouble ticket server changes a state of a switch contact upon the receipt of a user reported error.

3. The system of claim 1, wherein the monitoring system and the trouble ticket server are coupled by a serial communication link.

4. The system of claim 3, wherein the user reported errors described in a form and the contents of the form are transmitted to the monitoring system.

5. The system of claim 4, wherein the monitoring system is programmed to interpret the contents of the form and request one or more diagnostic reports from the PBX, wherein the contents of the form and the results of the diagnostic tests are transmitted by the monitoring system to the customer service center.

6. The system of claim 1, wherein the monitoring system and the trouble ticket server are coupled by a LAN connection.

7. The system of claim 6, wherein the user reported errors are described in a form and the contents of the form are transmitted to the monitoring system.

8. The system of claim 7, wherein the monitoring system is programmed to interpret the contents of the form and request one or more diagnostic reports from the PBX, wherein the contents of the form and the results of the diagnostic tests are transmitted by the monitoring system to the customer service center.

* * * * *